(12) United States Patent
Agassi et al.

(10) Patent No.: US 6,775,674 B1
(45) Date of Patent: Aug. 10, 2004

(54) AUTO COMPLETION OF RELATIONSHIPS BETWEEN OBJECTS IN A DATA MODEL

(75) Inventors: Shai Agassi, Los Gatos, CA (US); Udi Ziv, Ra'anana (IL); Hannan Shulman, Ra'anana (IL)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 09/276,182

(22) Filed: Mar. 25, 1999

Related U.S. Application Data

(60) Provisional application No. 60/079,584, filed on Mar. 26, 1998.

(51) Int. Cl.[7] .............................................. G06F 17/00
(52) U.S. Cl. ................. 707/100; 707/1; 707/2
(58) Field of Search .................. 707/1–10, 100–104.1, 707/509

(56) References Cited

U.S. PATENT DOCUMENTS

| | | | | |
|---|---|---|---|---|
| 5,548,749 A | * | 8/1996 | Kroenke et al. ............. | 395/600 |
| 5,553,218 A | * | 9/1996 | Li et al. ...................... | 395/148 |
| 5,659,723 A | * | 8/1997 | Dimitrios et al. ........... | 395/614 |
| 5,758,335 A | * | 5/1998 | Gray ........................... | 707/101 |
| 5,774,128 A | * | 6/1998 | Golshani et al. ............ | 345/440 |
| 5,848,424 A | * | 12/1998 | Scheinkman et al. ....... | 707/501 |
| 5,884,311 A | * | 3/1999 | Blattmann-Bleile et al. .. | 707/10 |
| 6,014,670 A | | 1/2000 | Zamanian et al. | |
| 6,052,687 A | * | 4/2000 | Miura et al. ................. | 707/100 |
| 6,128,621 A | | 10/2000 | Weisz | |
| 6,202,099 B1 | | 3/2001 | Gillies et al. | |
| 6,233,578 B1 | | 5/2001 | Machihara et al. | |

OTHER PUBLICATIONS

IBM TDB (Automatic Query Generation, IBM Technical Disclosure Bulletin, Apr. 1991, vol. 33, No. 11, pp. 439–440).*

* cited by examiner

*Primary Examiner*—Jean M. Corrielus
*Assistant Examiner*—Joon Hwan Hwang
(74) *Attorney, Agent, or Firm*—Townsend and Townsend and Crew LLP

(57) ABSTRACT

In a computer system including a database system wherein queries to the database system can be specified by selecting a first object and a second object, with a query result being based on a relationship between the first object's metadata and the second object's metadata, relationships are generated by automatically populating a relationship matrix having undefined relation cells therein from pre-defined relationships represented by defined relation cells in the relationship matrix and transitively completing a local set of relationships defined in the relationship matrix.

8 Claims, 7 Drawing Sheets

AUTO COMPLETION OF RELATIONSHIPS BETWEEN OBJECTS IN A DATA MODEL

CROSS-REFERENCES TO RELATED APPLICATIONS

This application claims priority from U.S. Provisional Application No. 60/079,584, filed Mar. 26, 1998, the disclosure of which is incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of data navigation. More specifically, one embodiment of the invention provides an application developer with an improved method and apparatus to define relationships between data objects.

The typical data navigator used to navigate through complex databases requires the application developer to know ahead of time the relations between the objects in the database. Most applications that allow navigation use icons, buttons or highlighted words (anchors) to point to related objects. An anchor represents a known relationship between objects, usually a relationship that is defined in database schema in the form known as a "foreign key". Relations may also be coded in the application code itself. These relations require the developer of the applications to specifically define the relationship and attach this specific definition of the relationship to the anchor. This poses a number of problems in the creation process, which is long and tedious, but also poses problems in the maintenance of these applications. If any of the relationships has been changed, the developer most likely will need to change the application and its layout of its displays in order to represent of these changes.

The system of Hyper-relational data navigation described in U.S. Pat. No. 5,848,424, owned by the assignee of the present application, which is incorporated herein by reference for all purposes, shows a data navigator for use in a HyperRelational navigation system ("HRNS") that improves on the typical "hypertext" metaphor of navigation on the World Wide Web ("WWW"). In one aspect of that interface, a browser displays hypertext pages and indicates draggable elements on the page being viewed. The browser also displays drop targets and allows the user to drag a draggable element onto a drop target. The browser and/or server (to which the browser is connected) then perform an action, which is a function of both the dragged element and the drop target. Usually this action involves getting data from a database, processing that data, and displaying the result. The details of the action—i.e., what data to get, what processing to do—are determined by the user's choice of dragged object and drop target. The action taken by the HRNS in response to a user request is therefore dependent on a definition of relationships between the objects. These relationships must typically be prepared in advance in order for the HRDN to work well.

SUMMARY OF THE INVENTION

One embodiment of the present invention provides a mechanism to infer a set of relationships between objects in a data model. The relationships between the objects can be used to refer from one object to another, and in particular, can be used in a HyperRelational navigation system ("HRNS"), to navigate between objects.

An auto completion process preferably starts with some pre-defined relationships. The pre-defined relationships are referred to herein as "basic" relationships. This set can be derived from the object model automatically or can be defined manually by the user.

The autocompletion process attempts to automatically complete all possible relationships between any object and any other object in the object model. The required result is the creation of a relationship between any two objects that follows the most logical path between those two objects. In cases where no such path exists, no relationship between the two objects will be created.

If the graph of basic relationships is a "connected graph" (then there are no two or more subsets of relationships that have no relationship defined between an object in one subset to an object in the other subset) with a connected graph, an unrestricted autocompletion process will find a relationship for any two objects.

After the autocompletion process completes, the output of the process, the set of relationships between the objects, together with the basic set of relationships forms the "full" set of relationships between the objects in the object model. This full set of relationships can be used by other processes or applications, and particularly by a HRNS. In an HRNS, each instance of data from an object can be dragged and then dropped on any object if a relationship exists between the two objects. After the drop, data from the second object that relates, according to a relationship from the full set, to the dragged data from the first object will be obtained and displayed.

DETAILED DESCRIPTION OF THE INVENTION

One embodiment and a few variations are described herein and shown in the figures as an embodiment of a computer system running the Windows® 95 operating system and using data which resides on a Microsoft® SQL Server RDBMS (Relational Database Management System) developed by Microsoft Corporation of Redmond, Wash. However it should be noted that other computers, operating systems and database systems (relational and nonrelational) are ready equivalents for those elements. The example application shown in the figures is a system that is used with a HyperRelational navigating system ("HRNS") to navigate through a database of authors, books and publishers.

In many databases, a schema defines a layout of the tables and their properties and includes indications about relationships between some of the objects. In most relational databases, these indicia might specify properties of one object which refer directly to a specific instance of a second object. This format of reference between objects is known as "Foreign Key". Sometimes these foreign keys are specifically mentioned in the definition of the database, while in other cases, the foreign keys might not be explicit. Instead, the foreign keys are known to the database designer and this knowledge can be available to others. The development application reads the schema from the database and obtains indications of all objects (database tables in this case) and their properties (or columns). If this schema includes definitions of foreign keys, they are read and used as "basic" relationships between objects. The user of the development environment can set such basic relationships manually by defining relationships between objects.

Once a set of basic relationships is obtained (either from the foreign key definitions or manually), the autocompletion process can be performed on this set. The autocompletion process takes any 2 objects and finds out if there is a path of relationships between these objects. If such a path is found, the path will be saved as a new relationship between the objects.

If more than one such path exists for any pair of objects, the autocompletion process uses a pre-defined strategy to decide which path to save (if any) and which to discard. In some cases, more than one relationship is found and saved for a given pair of objects, as explained below. One of the simplest strategies that can be used is to select the shortest weighted path between the two objects. Thus, if there is more than one path of relationships between two objects, the path that uses the smallest number representing the total sum of all relationship weights between objects will be picked. That path can be any one that satisfies the rules of the chosen strategy, and might be found using a path search method known in the art for finding directed paths in graphs.

Figure 1:
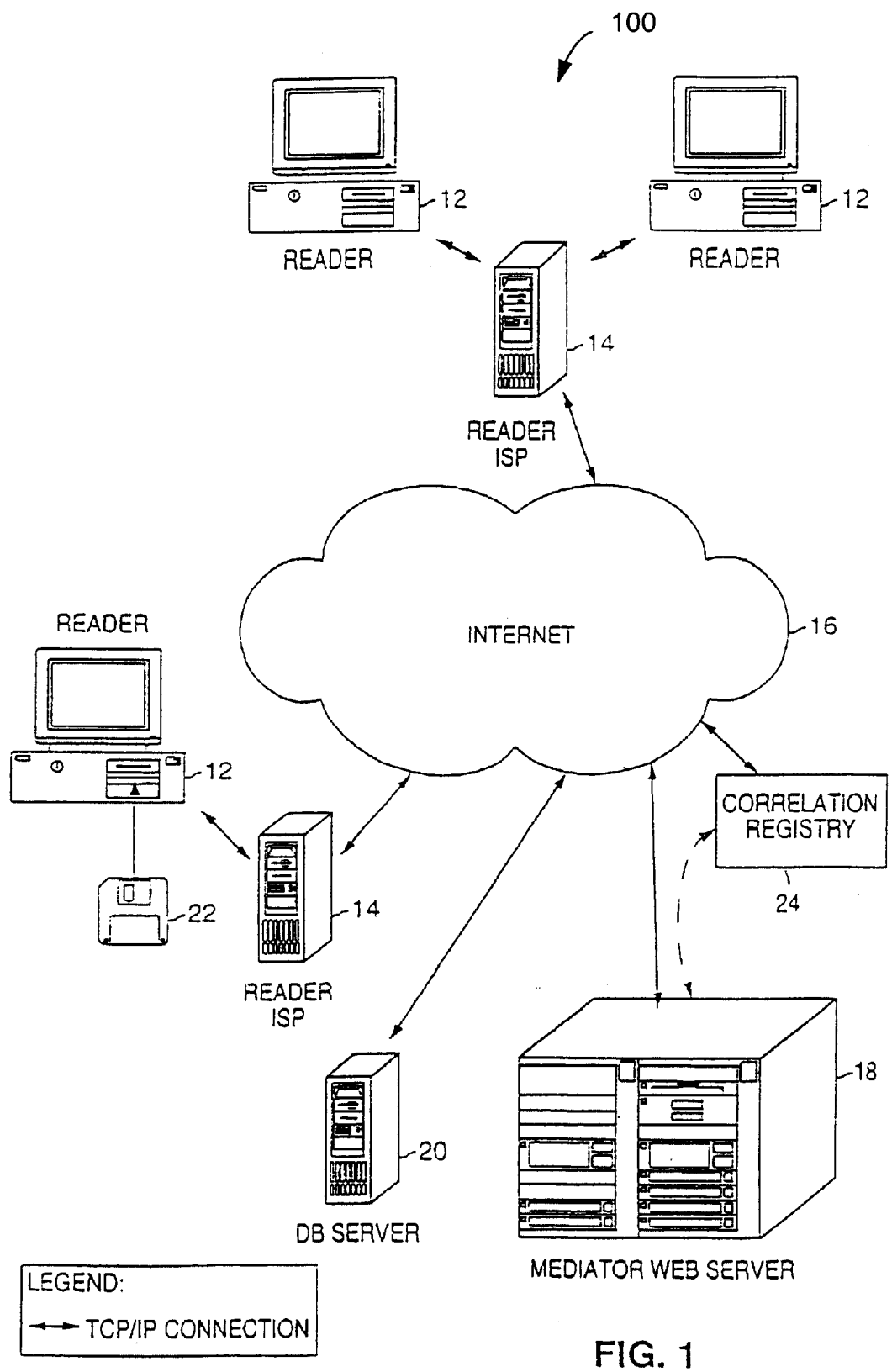
FIG. 1 is a schematic diagram of a network over which the present invention might be used.

FIG. 1 is a block diagram of a network 100 over which an embodiment of an auto completer according to the present invention might operate. An HRDE (HyperRelational Development Environment) is connected to DB server 20 in order to access the data in the database. Other connections are also possible (including, but not limited to, an HRDE system accessing the data directly, when this data resides on the same machine as the HRDE system). The autocompletion process can be part of an application other than an HRDE application. In particular, it might be a stand alone application or a function invoked by another process.

Figure 2:
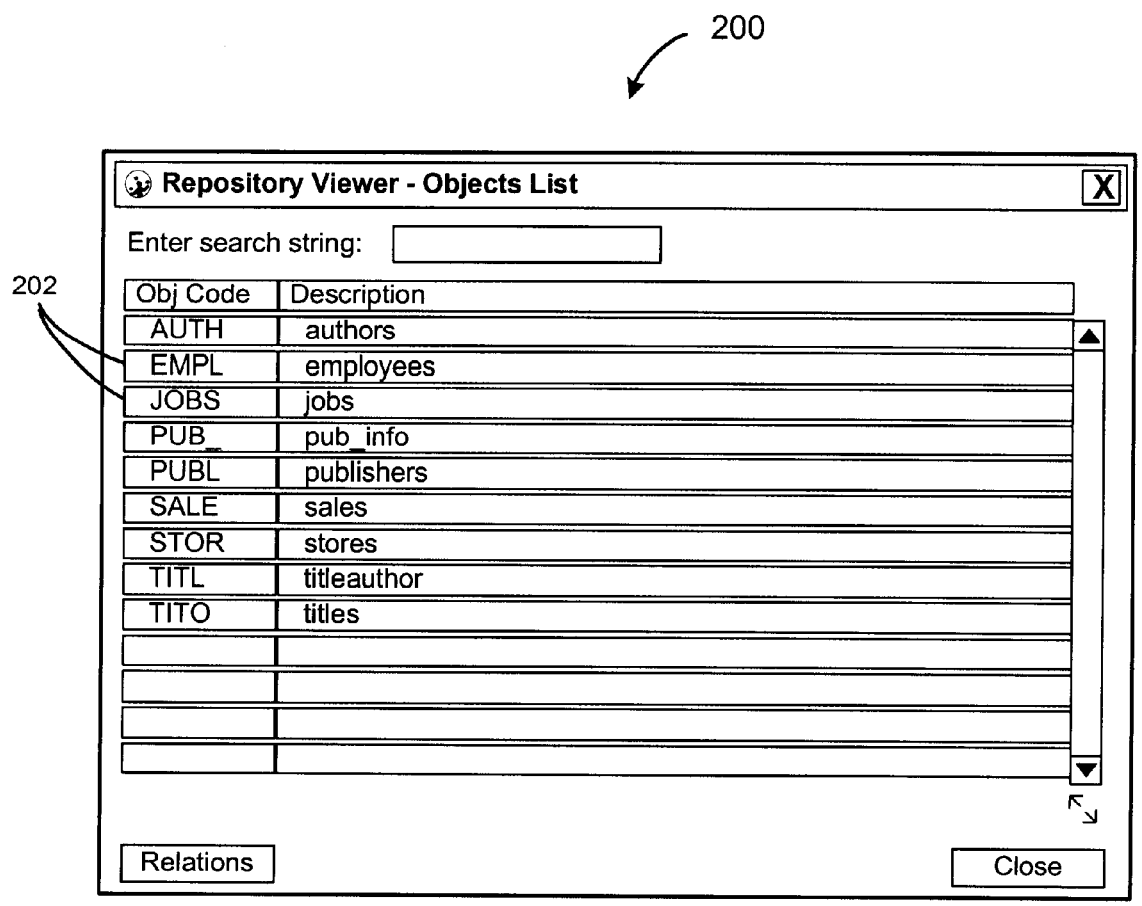
FIG. 2 is a screen display showing a list of objects.

A list of some or all of the objects in the database can be obtained by reading the schema of the database. FIG. 2 shows a list of objects extracted from the database of authors, books and publishers. Although not shown, each of these objects 202 has a list of properties and other attributes.

Figure 3:
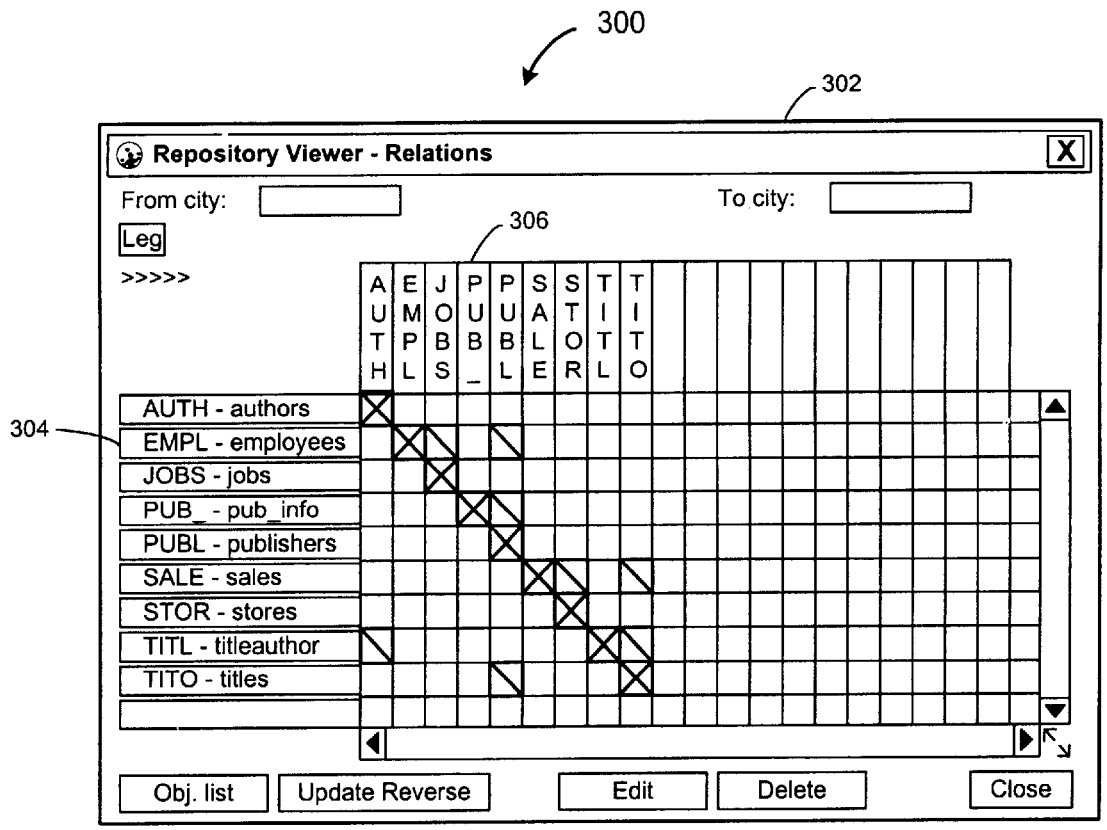
FIG. 3 is a screen display showing a relationships matrix with some basic relationships.
Figure 3:
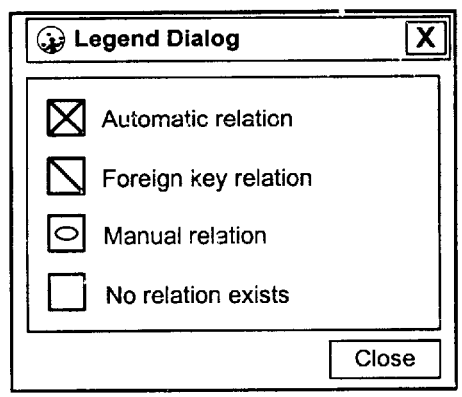

The database in this example has several foreign keys defined. These foreign keys were extracted by the HRDE and are used as the basic set of relationships. FIG. 3 shows a matrix 302 that indicates, for each pair of objects, if there is a relationship defined between them. For example, a foreign key relation exists between an EMPL object 304 for employees and a PUBL object 306 for publishers. FIG. 3 shows the status of the relationships before the autocompletion process, with pre-defined relationships already defined. In particular, as entitled in bar 408, such a relationship, where the relationship between a Title object 402 and a Publisher object 404 is defined. This relationship was extracted from the foreign key defined for the Titles table that refers the Publishers table. This is indicated by selection of foreign key button 406. Alternatively, the user of the HRDE system could have entered the relationship as a simple relation.

The autocompletion process tries to find relationships between any two objects, preferably the shortest path between any two objects. One such autocompletion process begins with a relationship (e.g., the one between Publishers object 402 and Titles object 404) and finds all relationships that emanate from that object. Then for each relationship of the object referred to in the previous step (i.e., for each relationship of the Title object, such as the relationship between Titles and Sales), the autocompletion process constructs a new relationship that is built by linking the first relation to the second ([Publishers→Titles]+[Titles→Sales] derives [Publishers→Sales]. The constructed relationship will be a relationship between Publishers and Sales that gives all the sales of titles of the given publisher. The length of the constructed relationship is the sum of the length of the two relationships that were used to build it. In the above example, the length is two. The above steps are repeated for each relationship in the set of relationships and, after constructing the new relationships, each new relationship between any two objects will be added to the relationship set, provided that there was no previous relationship between the two objects, or that the new relationship is of a shorter length. Where the new relationship is shorter, the shorter one replaces the existing one. This continues until no new relationships are added.

Next, all relationships of length 2 are found, so the set contains relationships of length 1 or 2. Then, new relationships of length 3 and 4 are found and some (those who do not have shorter alternative) are added. Each such iteration will find all shortest relationships up to the length of 2 to the power of N, where N is the iteration number.

When the autocompletion process is done, all object pairs that could have a relationship end up being assigned one. The above description is of just one example and other alternatives that give the desired results that will be apparent upon reading this description.

Figure 5:
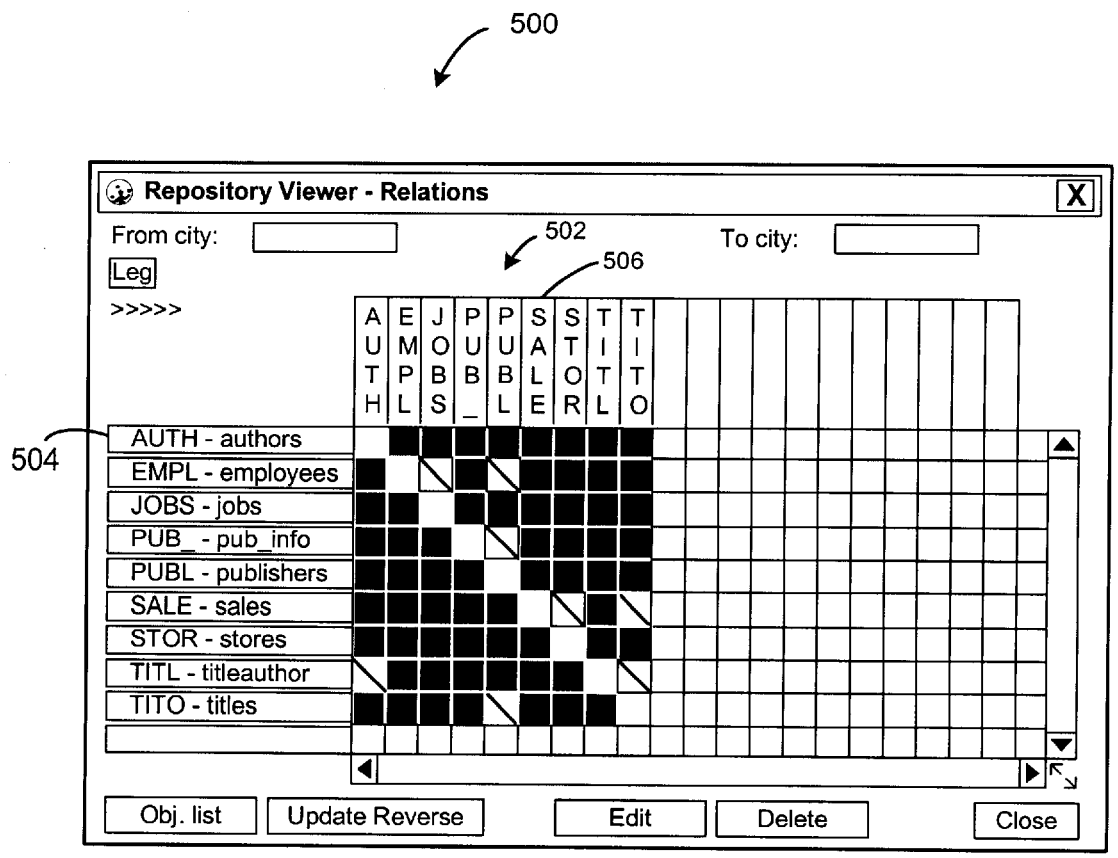
FIG. 5 is a screen display showing a relationship matrix with relationships found by the Auto Completion process.
Figure 5:
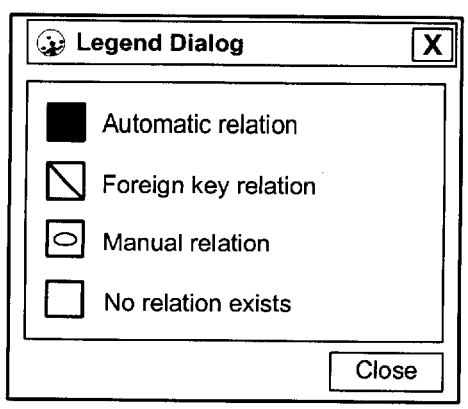
Figure 6:
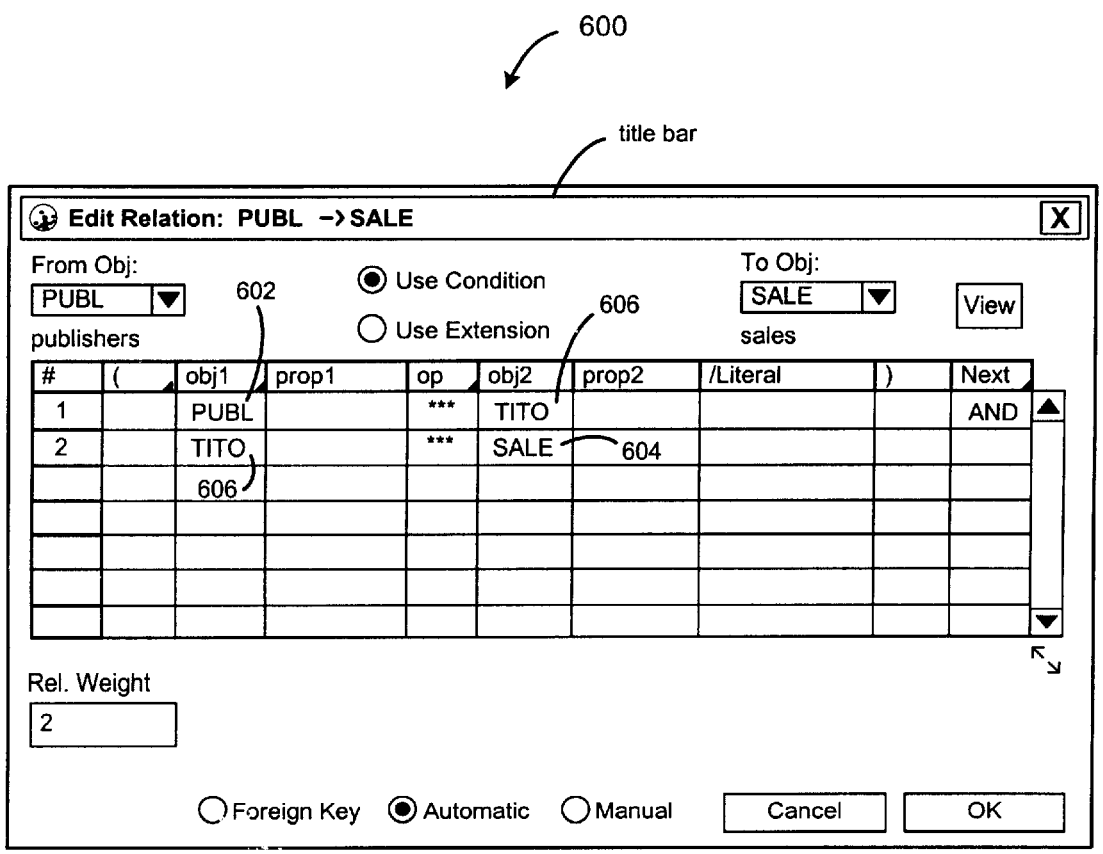
FIG. 6 is a screen display showing one relationship that was generated by an autocompletion process according to one embodiment of the present invention.

In FIG. 5, a relation matrix 502 shows all the relationships that are defined after the autocompletion process has finished. In this example, all object pairs have a relationship assigned. For example, an automatic relation is defined between the authors object 504 and the sale object 506. FIG. 6 shows one of relationships found, namely, the relationship between the Publishers object 602 and the Sales object 604. The relation between the Publishers objects 602 and the Titles objects 606 and the relationship between the Titles 606 and the Sales objects 604 defines this relationship. We can state from this relationship between the Publishers and the Sales that sales that relate to publisher are "all the sales of all the titles of the publisher".

Using Weights

Figure 4:
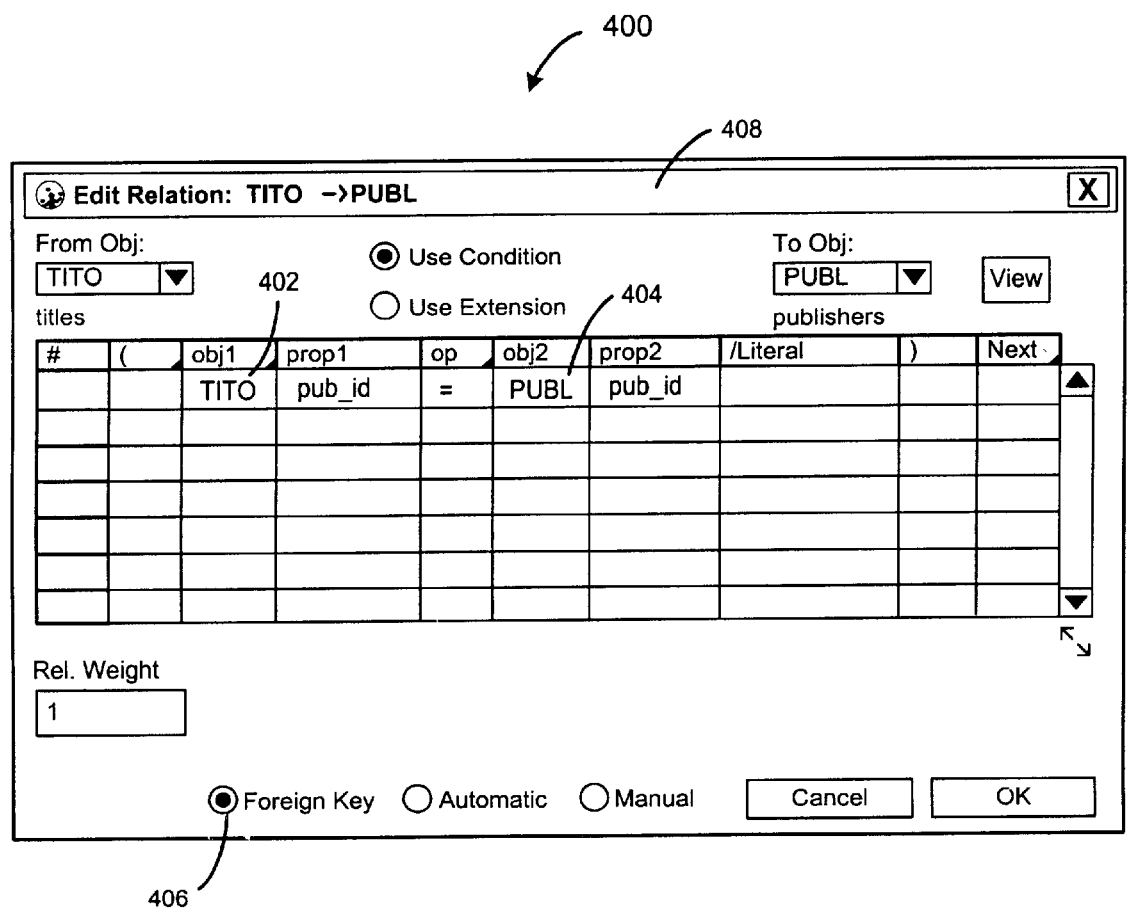
FIG. 4 is a screen display showing one basic relationship.

Another useful strategy for choosing a relationship between objects involves setting weights to the basic relationships. Each basic relationship is assigned a weight by the user or by another program. The weight can reflect the "importance" of the relationship, or "how much it should be considered in building other relationships". The autocompletion process finds, for every pair of objects, the relationship that has the smallest weight, i.e., the sum of all weights of all the basic relationships in the path of the composed relationship is minimized. The previously described strategy of finding relationships with the shortest path is a special case of this method with all the basic weights assigned a weight of one (as shown in FIG. 4). Another special case of this method is to mark some of the basic relationships with a weight of "infinity" meaning they should not be used to build a composed relationship in any case.

Usage Example

Figure 7:
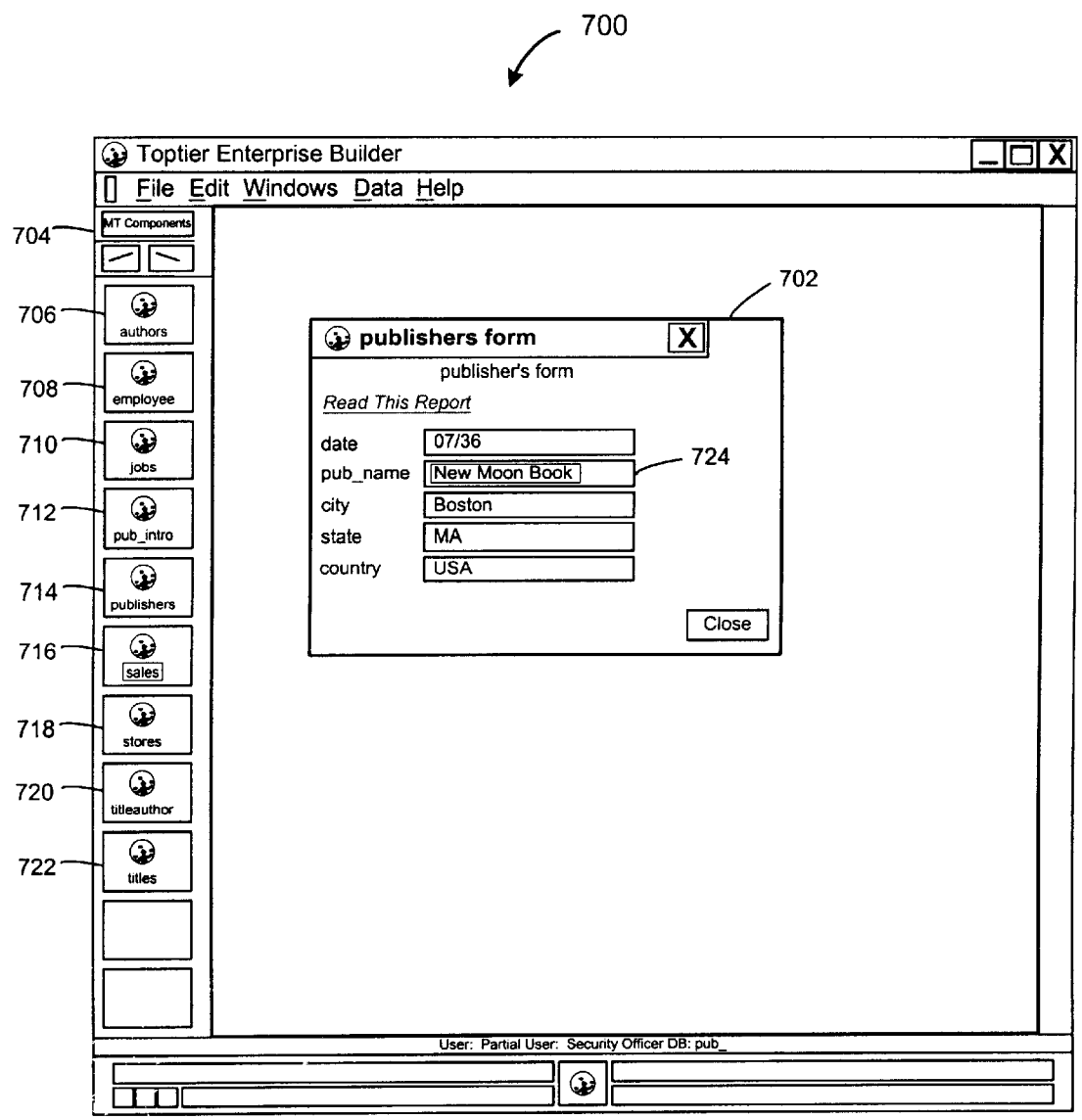
FIG. 7 is screen display generated by a program that uses the relationships created by the autocompletion process.

A HyperRelational Navigating System can use the full set of relations in order to navigate through the data. FIG. 7 shows a screen 700 of such a Navigation System in which one record of the Publishers object 702 is shown on the right side. A toolbar 704 containing icons 706, 708 . . . 722 of all objects is displayed at the left side. Dragging the publisher name 724 and dropping it on top of the Sales object Icon 716, will result in a new list, displaying all sales that relate to the dragged data, i.e., all sales of titles that were published by the publisher "New Moon Book."

Multiple Relationships

The previous sample strategies for the autocompletion process assumed that if there is more than one relationship available between two objects, there should be a way to decide which one of them is the one to be set and used. However, the autocompletion process can be set to find more than one relationship between a pair of objects. It might find all of the available relationships or the best M relationships or all relationships that meet a certain criteria. No matter what the criteria for choosing these relationships, they can all be found and those chosen by the autocompletion process will be saved as possible relationships for the given pair.

Any application that will be using the resulting relationship matrix will need to be able to choose which one of the relationships of a given pair it should use. That application may either use one of these relationships (based on its weight or any other criteria) or may prompt the user to decide which one of the relationships to use.

The autocompletion process is based on a set of basic relationships that, as described above, can be obtained from the database schema or by other methods. Each such basic relationship is not limited to a simple "foreign key" relationship, but can contain any type of condition that relates the two objects. These types may include scripts, function calls or multi-attribute relationships. The relationship should preferably be stored in a format that allows an application to take an instance (or instances) of the first object and find all the related instances of the second objects, using the definition of the relationship. These relationships return the related data and metadata of related instances.

The autocompletion process can be controlled and parameterized in many ways. As described above, the strategy upon which the autocompletion process chooses the relationships can be decided and changed to achieve different goals. In particular, one can set limits on the desired weight or length of a relationship, thus limiting the process from finding relationships that are too remote or make little sense to the end user. The autocompletion process might replace basic relationships and manually added relationships with newly found ones that have better weight. The autocompletion process might be used incrementally, i.e., instead of letting the autocompletion process to find all relationships at once, it might be used to find the "next stage" of relations where, in each stage, the length of the relations may increase, or the allowed total weight may be enlarged. In this manner, the user or the calling process can control the result and can decide how and if to continue with the process.

Another parameter that can be set is whether each of the basic relationships is a symmetric one. In some cases, it might be desired that one relationship will be defined in one direction and a different one will be used for the other direction. This especially might be the case when the basic relationship is defined using a function call.

The resulting set of relationships between objects may be edited manually. A user, or another process, might add relations, change some of the relations or even delete some of them, and by that may change the set to better reflect the relationships between the objects as the designer (or the other process) contemplate it.

The autocompletion process finds relationships between all given objects, based on basic relationships. The initial list of objects might represent objects from more than one data model. If there are any basic relationships defined between objects from two separate object model, these basic relationships are considered as "correlation" relationships that are used to correlate between the object models. The autocompletion process might find new relationships between objects from the two models and thus allow any HyperRelational Navigating system to navigate between objects from one object model to objects in the other one. With this, the autocompletion process can span multiple models to create complete cliques out of disparate sets of cliques.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. In a computer system including a database system wherein queries to the database system can be specified by selecting a first object and a second object, with a query result being based on a relationship between the first object's metadata and the second object's metadata, a method of generating the relationship comprising the steps of:

automatically populating a relationship matrix having relation cells therein from pre-defined relationships, thereby defining a subset of the relation cells in the relationship matrix; and for at least one of the relation cells in the relationship matrix not defined in the step of automatically populating, completing the at least one relation cell by:

a) identifying at least one relationship path between metadata of the objects associated with the at least one relation cell, wherein each path comprises at least one link between objects, each link having a weight associated therewith;

b) if only one path is identified, populating the at least one relation cell with a relation defined by the one path; and c) if more than one path is identified, populating the at least one relation cell with a relation defined by a preferred path selected from the more than one path, the preferred path being determined based on respective sums of the weights associated with each link in the more than one path.

2. The method of claim 1, further comprising a step of storing more than one relationship path for at least one pairing of the first object and the second object.

3. The method of claim 1, wherein the weight associated with each link represent a relative importance of the link.

4. The method of claim 1, wherein the weight associated with each link are signals of user preference among the links.

5. A method of defining new relationships between objects in a data model, the new relationships being defined based on pre-existing relationships between the objects, the method comprising:

determining a first pre-existing relationship between a first object and a second object;

determining a second pre-existing relationship between the second object and a third object;

automatically creating, in a relationship matrix, at least one new relationship between the first object and the third object based on the first pre-existing relationship and the second pre-existing relationship, the at least one new relationship comprising at least one link, each link having a weight associated therewith;

if the at least one new relationship is more than one new relationship, associating each of the more than one new relationships with a sum of the weights associated with each link of the more than one relationship;

if the at least one new relationship is more than one new relationship, selecting among the more than one new relationship based on the sums associated with the relationships, to derive one or more selected relationship;

storing the one or more selected relationship created between the first object and the third object; and specifying a query for the data model by selecting the first object and the third object, with a query result being based on the stored relationship between the first object's metadata and the third object's metadata.

6. The method of claim 5 further comprising:

creating a new relationship between the first object and each of a set of other objects, wherein each of the set of other objects have a pre-existing relationship with the second object using at least the second pre-existing relationship; and storing into the data model each new relationship created.

7. The method of claim 5 wherein the weight associated with each link indicates a relative importance of the link to the relationship.

8. The method of claim 5 wherein a third pre-existing relationship exists between the first object and the third data object, the method further comprising:

replacing the third pre-existing relationship with the new relationship created.

* * * * *